Dec. 26, 1967  J. A. MALIANDI  3,359,878
AUTOMATIC PHOTOGRAPHIC POSITIVE PRINTER
Filed Jan. 19, 1965  7 Sheets-Sheet 3

INVENTOR.
Joseph A. Maliandi
BY
Polachek & Saulsbury
ATTORNEYS.

Dec. 26, 1967 J. A. MALIANDI 3,359,878
AUTOMATIC PHOTOGRAPHIC POSITIVE PRINTER
Filed Jan. 19, 1965 7 Sheets-Sheet 4

INVENTOR.
Joseph A. Maliandi
BY
Polachek & Saulsbury
ATTORNEYS.

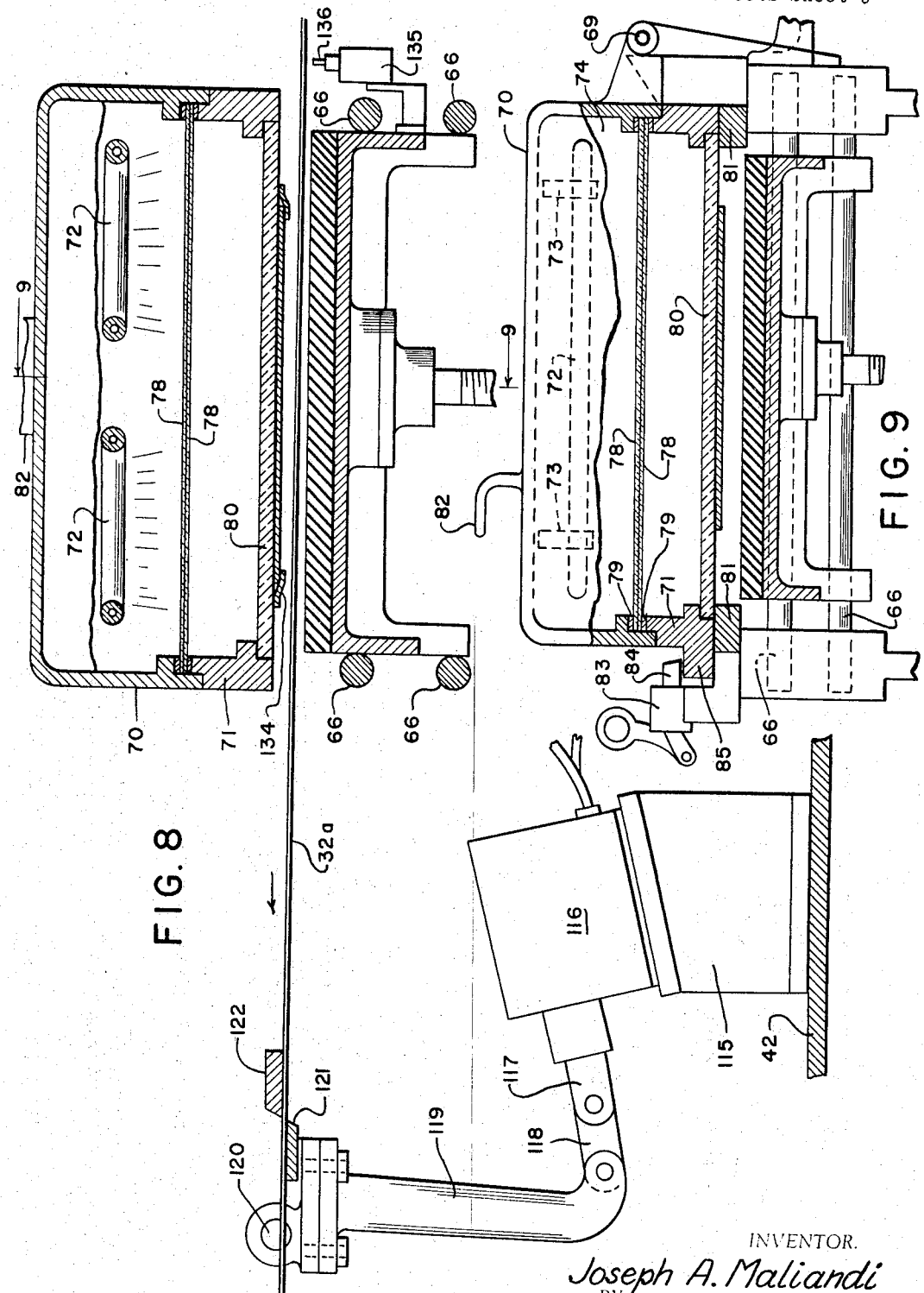

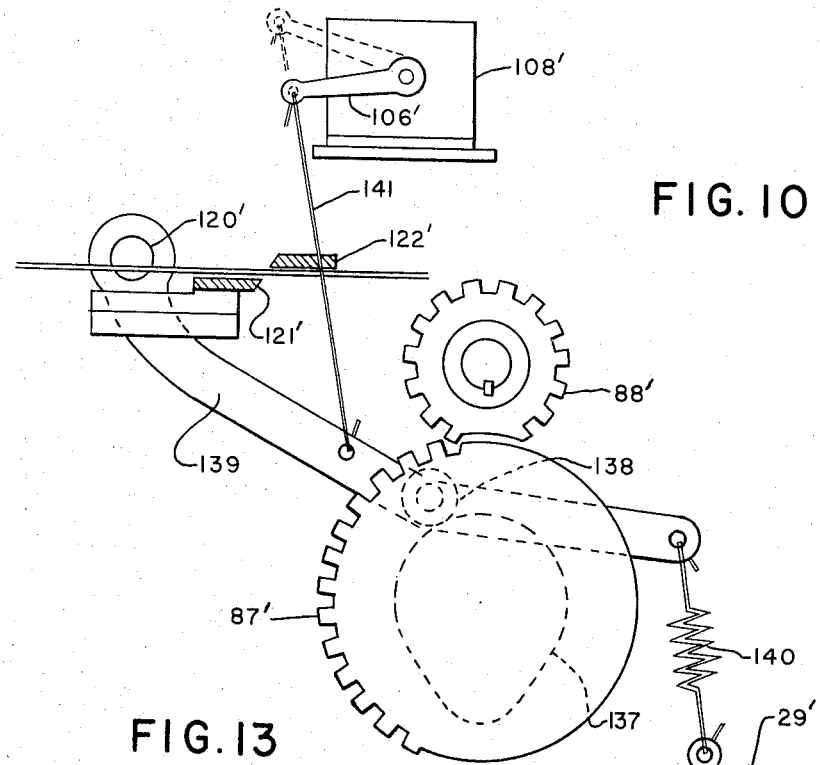
FIG. 10
FIG. 13
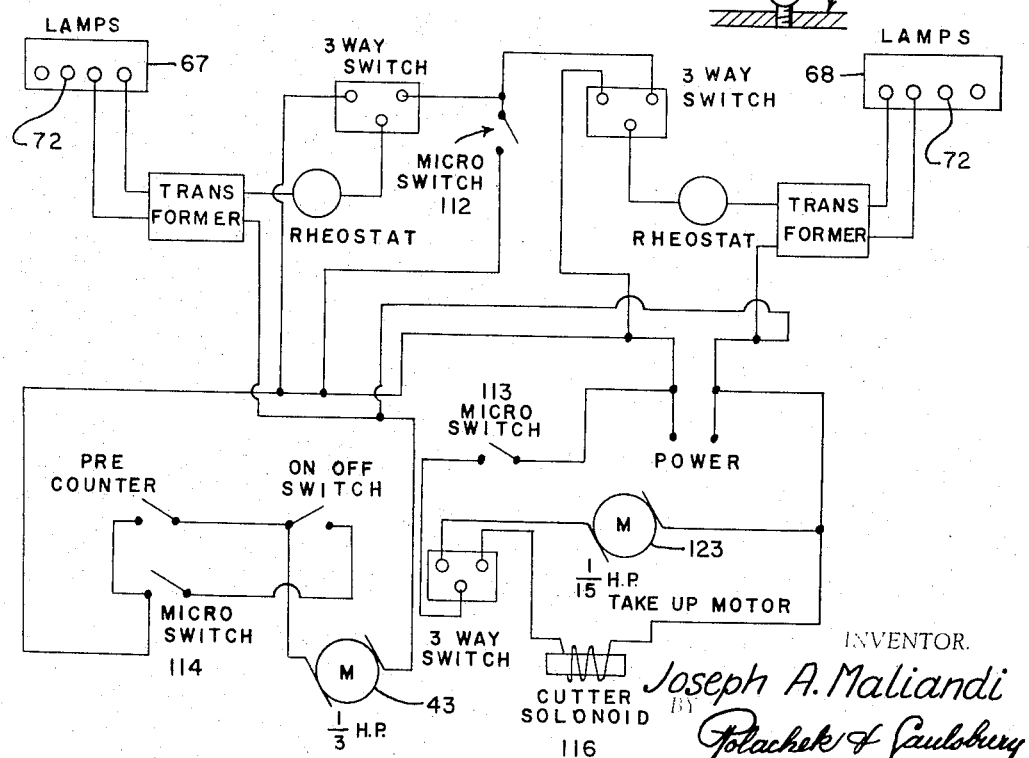

Dec. 26, 1967     J. A. MALIANDI     3,359,878
AUTOMATIC PHOTOGRAPHIC POSITIVE PRINTER
Filed Jan. 19, 1965     7 Sheets-Sheet 7
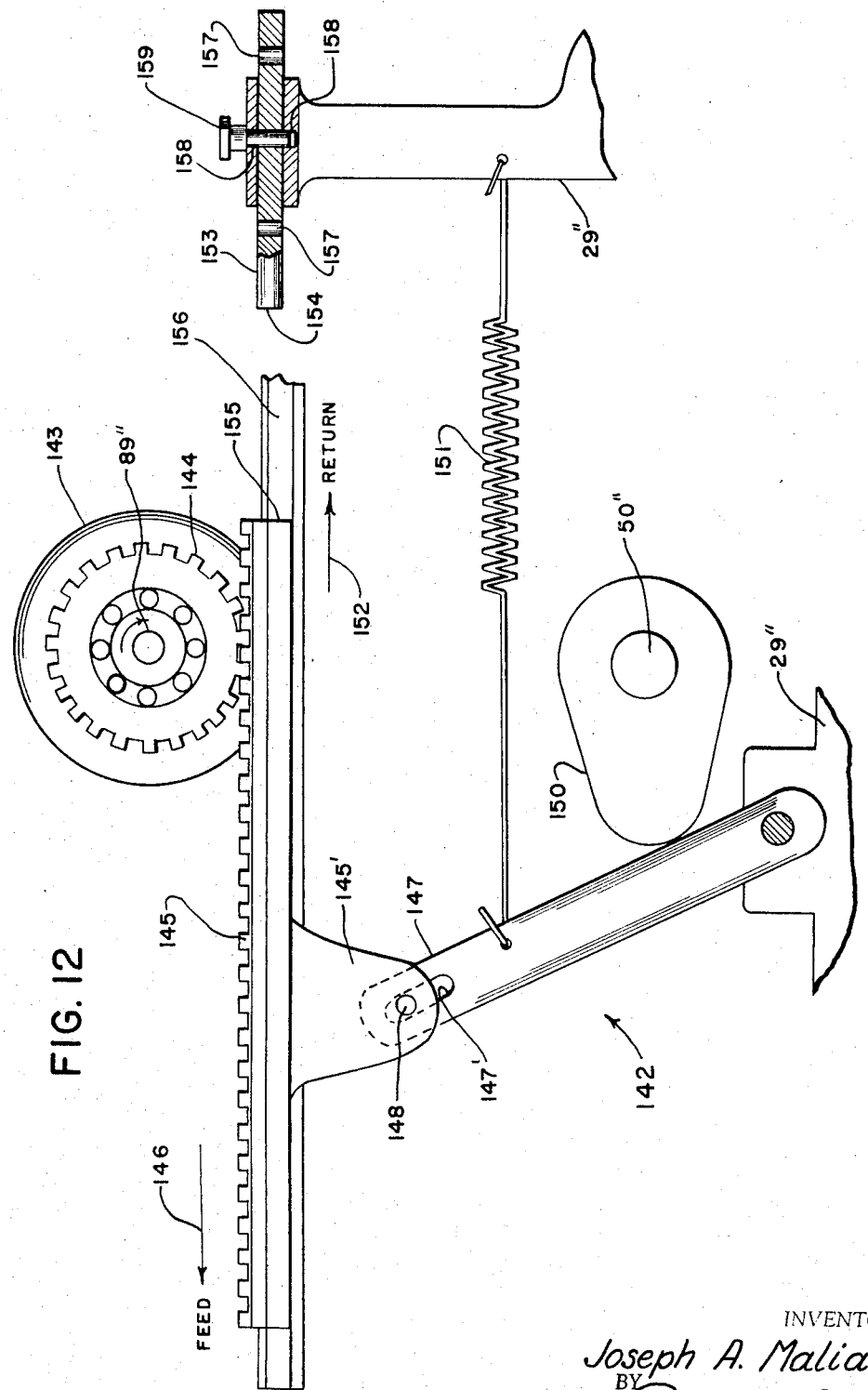
INVENTOR.
Joseph A. Maliandi
BY Polachek & Saulsbury
ATTORNEYS.

United States Patent Office 3,359,878
Patented Dec. 26, 1967

3,359,878
AUTOMATIC PHOTOGRAPHIC POSITIVE
PRINTER
Joseph A. Maliandi, 7315 Ave. U,
Brooklyn, N.Y. 11234
Filed Jan. 19, 1965, Ser. No. 426,502
13 Claims. (Cl. 95—75)

ABSTRACT OF THE DISCLOSURE

An automatic photographic positive printer having self contained means for allowing a setting up operation to be in progress on the printer while the printer is simultaneously printing, thus while one job is being printed, another job can be readied for being printed after the first job is completed. The printer includes a framework supporting movably a reel of positive photographic paper, with means for intermittently halting such movement. Means is also provided for exposing the positive photographic paper to a negative. A pair of light boxes holds the negative during exposure thereof to the positive photographic paper. The boxes are selectively movable from inoperative to operative printing position.

---

This invention relates generally to automatic printing machines. More specifically it relates to machinery for automatically printing positive prints from a photographic negative.

A principal object of the present invention is to provide an automatic photographic positive printer having self contained means for allowing a setting up operation to be in progress on the machine while the machine is simultaneously printing; thus while one job is being printed, another job can be readied for being printed after the first job is completed. Thus the machine need not be halted for extensive periods between jobs for making a new set up thereupon. Thus the machine can remain in continuous production and be more profitable.

It is another object of the present invention to provide an automatic photographic positive printer wherein the positive paper moves across the machine without frictional contact with the photographic negative during the moving operation thereby preventing the forming of scratches on either the negative or positive paper.

It is still another object to provide an automatic photographic positive printer wherein the positive paper passes below the photographic negative during the travel across the machine.

It is yet another object of the invention to provide an automatic photographic positive printer having self contained means to automatically stop the machine operation after a preselected number of positive copies are printed in each job.

It is a further object of the invention to provide an automatic photographic positive printer which is adjustable for printing jobs of different photographic sizes.

It is a still further object of the invention to provide an automatic photographic positive printer wherein positive paper in roll form is delivered into the machine and wherein the exposed positive paper is delivered from the machine in either roll form or in individually cut pictures, as preferred.

Other objects of the invention are to provide an automatic photographic roll paper printer which is relatively simple in design, rugged in construction, easy to use and effective and efficient in operation.

Figure 1:
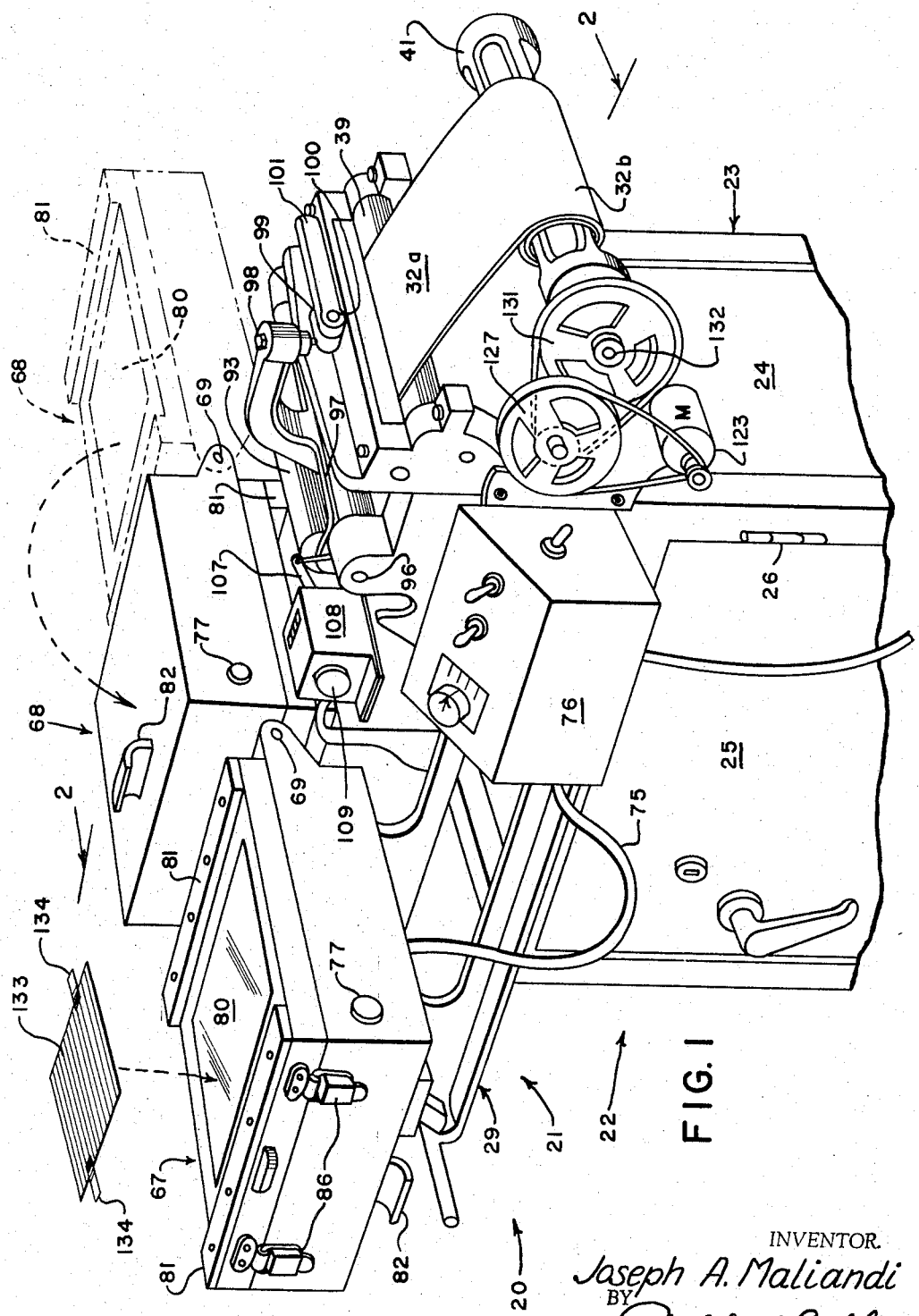
Figure 2:
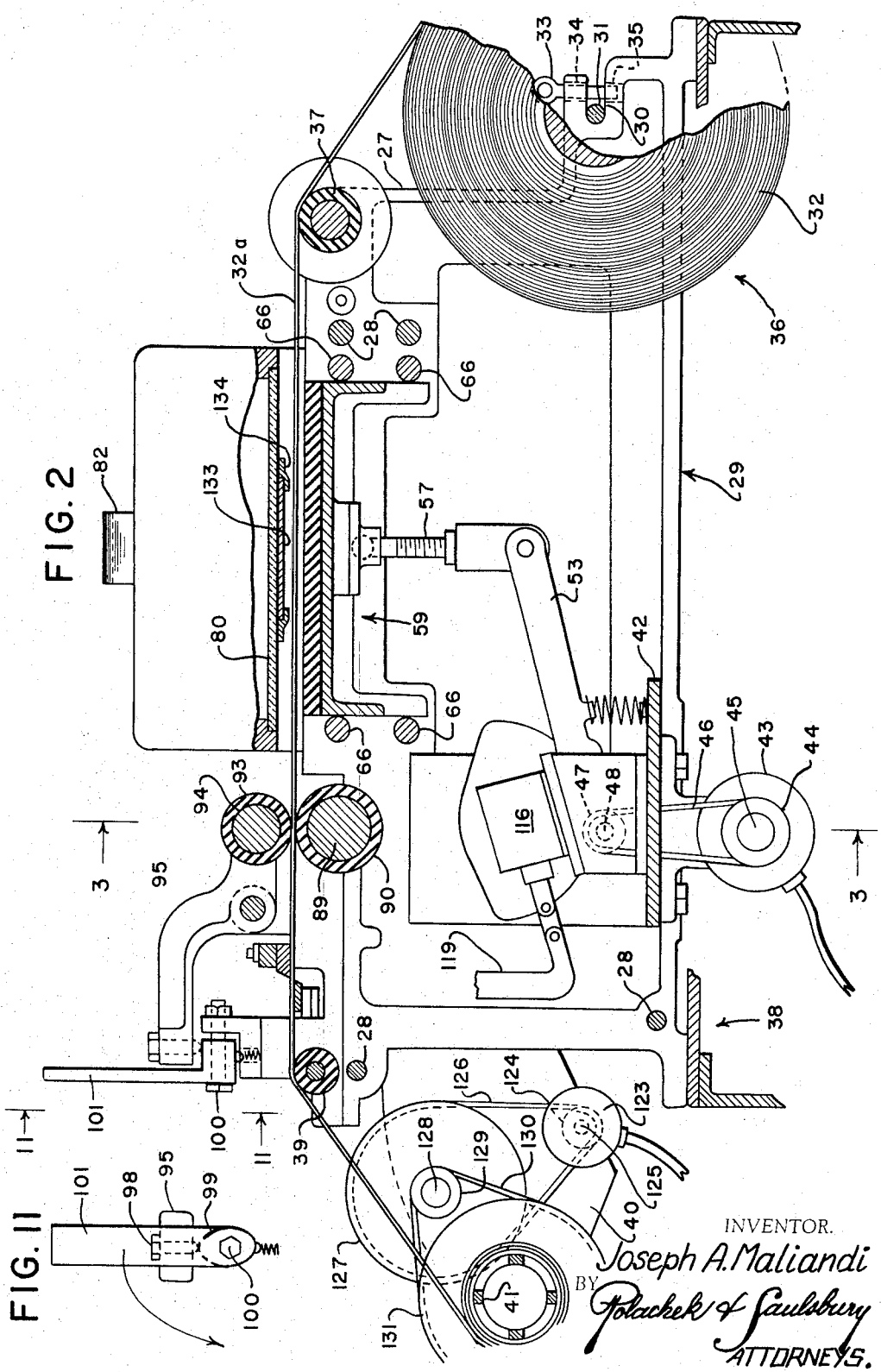
Figure 3:
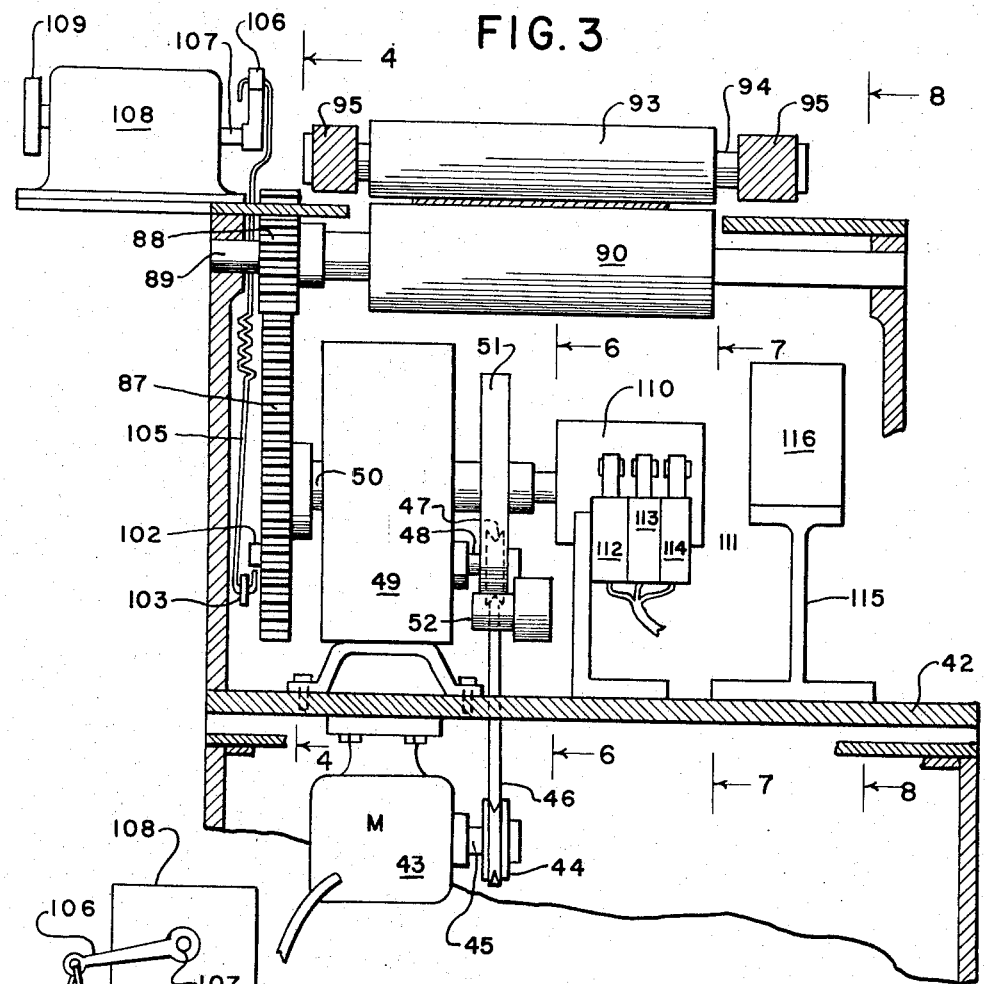
Figure 4:
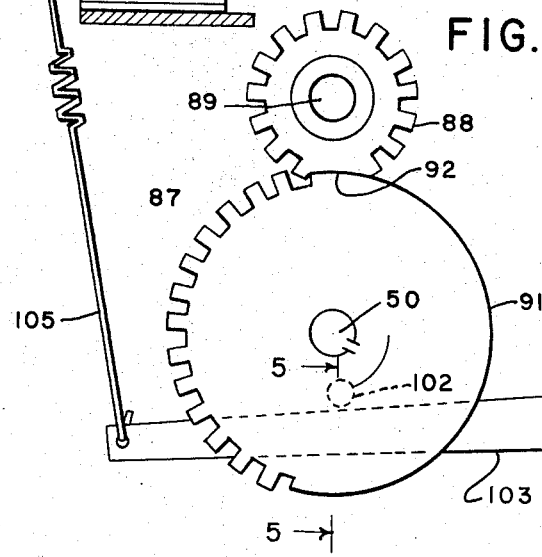
Figure 5:
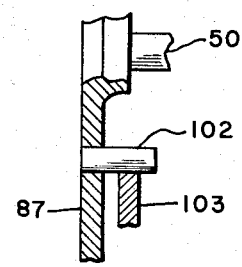
Figure 6:
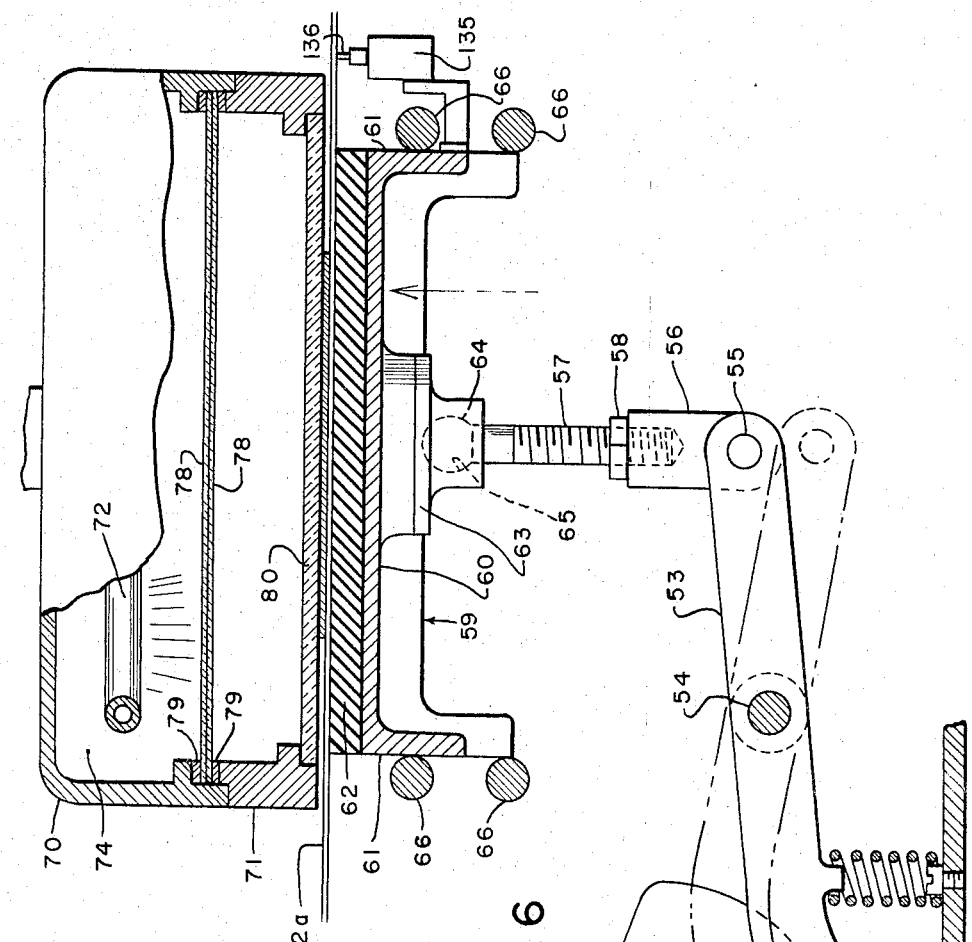
Figure 7:
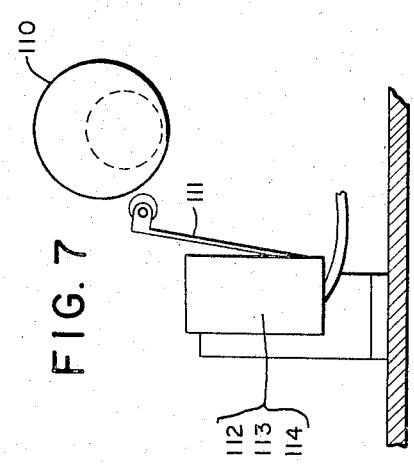

These and other objects will be readily apparent upon a study of the following specification and the accompanying drawings wherein FIGURE 1 is a perspective view of the present invention, FIG. 2 is a longitudinal cross sectional view taken on line 2—2 of FIG. 1, FIG. 3 is a transverse cross sectional view taken on line 3—3 of FIG. 2, FIG. 4 is a cross sectional view taken on line 4—4 of FIG. 3, FIG. 5 is a fragmentary cross sectional view taken on line 5—5 of FIG. 4, FIG. 6 is a cross sectional view taken on line 6—6 of FIG. 3, FIG. 7 is a cross sectional view taken on line 7—7 of FIG. 3, FIG. 8 is a cross sectional view taken on line 8—8 of FIG. 3, FIG. 9 is a cross sectional view taken on line 9—9 of FIG. 8, FIG. 10 is a cross sectional view taken in the same plane and position as FIG. 4 and showing a modified form of the construction shown in FIGS. 4 and 8, FIG. 11 is a view taken in the direction 11—11 on FIG. 2, FIG. 12 is a cross sectional view taken on a plane similar to FIG. 2 and showing a modified form of construction incorporating a paper feed drive which is adjustable for different photographic sizes, and FIG. 13 is an electrical circuit used in conjunction with the mechanical components of the present device.

Referring now to the drawings in detail the numeral 20 represents an automatic photographic roll paper printer according to the present invention wherein there is a machine 21 supported at a convenient elevation upon the top of a cabinet 22 which may be used for storage of paper and other supplies used in the process of printing photographic positives.

As shown in FIG. 1, the cabinet comprises a strong frame 23 made of angle irons or the like so as to support the weight of the machine 21. Panels 24 mounted on the frame 23 enclose a central storage area to which access is made possible by a side door 25 mounted on hinges 26.

The machine 21 includes a pair of longitudinal side frames 27 secured together by cross tie rods 28 thereby providing a rigid framework assembly 29 upon which the various working parts of the machine are carried.

At one longitudinal end of the frames 27, a horizontal notch 30 is provided for receiving a spindle 31 therebetween. A roll of undeveloped positive photographic paper 32 is mounted upon the spindle 31. A vertical lock pin 33 is received within openings 34 and 35 on the frames 27 and serves to hold the spindle 31 captive within the notches 30.

At the same longitudinal end of the framework 29 which supports the spindle 31 and which may herein be defined as the paper input end 36, there is a freely rotatable paper feed roller 37. At the opposite longitudinal end of the framework 29, and which may herein be defined as the paper output end 38, there is a freely rotatable paper feed roller 39. The positive paper travels from roll 32 across roller 37 and across roller 39, the paper between the rollers defined as 32a. At the end 38 of framework 29, a bracket 40 is secured upon which a take up roller 41 is mounted freely rotatable and upon which a roll of developed positive paper 32b is rolled up.

A platform 42 extends transversely across a lower portion of framework 29 and the principal drive mechanisms of the machine are located thereupon. On the underside of platform 42 a one-third horse power motor 43 is mounted. A pulley 44 is mounted on the shaft 45 of motor 43 and an endless belt 46 passed around the pulley 44, the endless belt 46 extending upwardly through openings in the platform and passing around a pulley 47 on an input shaft 48 extending out of a gear box 49 mounted upon the upper side of platform 42. Suitable gearing (not shown) is contained within the gear box 49 to reduce the drive speed from motor 43 to a speed suitable for driving the machine 21.

An output shaft 50 extends out of opposite sides of the gear box 49 and on one side thereof a cam 51 is fixedly mounted thereupon as shown in FIGS. 3 and 6. A cam follower roller 52 is in engagement with cam 51, the roller 52 being supported on one end of a rocker arm 53 pivoted at an intermediate point on a cross shaft 54 supported on framework 29. The opposite end of rocker arm 53 is attached by means of a pin 55 to a threaded block 56 in which a lower threaded end of a post 57 is adjustably carried and secured by a lock nut 58. A platen 59 is mounted upon the upper end of post 57.

The platen 59 comprises a generally square or rectangular horizontal plate 60 having depending sides 61 which are integrally cast. Upon the upper side of plate 60 a cushion 62 of sponge rubber is secured. On the underside of plate 60 a downward extending embossment 63 is formed to receive the upper end of the post 57 which has a spherical terminal end 64 that fits into a spherical opening 65 of the embossment thereby providing a universal joint between the parts. The platen is vertically slidable in response to movement of the rocker arm and is guided during its vertical travel between guide rods 66 mounted upon framework 29.

A pair of light boxes 67 and 68 are pivotally mounted upon the framework 29, as shown in FIG. 1. The light boxes 67 and 68 are each mounted upon an opposite side frame 27 by means of pins 69 and are each in a position so that either may be pivoted from an inoperative position to an operative position directly over the platen as shown in FIG. 1.

Each of the light boxes 67 and 68 is comprised of a hood 70 and base 71 releasably secured together. A neon lamp 72 supported upon posts 73 is contained within a compartment 74 formed within the hood 70. Appropriate electrical wiring 75 extends from the light boxes 67 and 68 to an electrical control box 76. A pilot light 77 on the outer side of each light box is in series electrical circuit with the neon bulb therein and visually indicates when the neon bulb is lighted. Between the hood 70 and base 71 there are a pair of filter glasses 78 made of plastic between which filter paper may be selectively placed to block out or dim the light intensity passing from the neon lamp through various areas of the filter glasses. Rubber gaskets 79 on opposite sides of the filter glasses force them together to prevent shifting of the filter paper therebetween. A negative glass 80 is fitted across the base 71 and secured thereto by means of a pair of bars 81 along two opposite side edges of the negative glass 80. It is to be noted that the hood 70 and the base 71 are each pivoted about pin 69 whether pivoted as a singular unit between an operative and inoperative position or as independent parts for gaining access to the filter papers. See FIG. 9.

A handle 82 on the hood 70 permits comfortable manipulation of the light box between an operative and inoperative position. A lock 83 mounted on the framework 29 has a sliding bolt 84 that fits over a lug 85 on the side of the light box base 71 serving to hold the light box rigidly secure in an operative position.

As shown in FIGS. 8 and 9, it is to be noted that the positive photo paper 32a passes between the platen and the light box and is in spaced apart relation therefrom when the paper is in motion.

It is to be further noted that the hood and base can be easily secured together by conventional sample luggage type snap locks 86 shown in FIG. 1.

On the opposite side of the gear box output shaft 50 there is mounted a sector gear 87 which is engaged with a gear 88 mounted on a size shaft 89, the shaft 89 also having a size roller 90 secured thereupon for the purpose of advancing the positive photographic paper 32a. As shown in FIG. 4, the sector gear 87 and gear 88 are each provided with flat portions 91 and 92 respectively and when these portions are in contact, the continuously rotating sector gear 87 cannot transmit rotational motion to gear 88. Thus intermittent rotational motion is delivered to the size roller 90 causing the paper 32a to alternately advance and then stop.

A pressure roller 93 is in line engagement with the size roller 90, the paper 32a passing therebetween. The pressure of the pressure roller 93 against size roller 90 may be relieved whenever wished such as during threading of a new paper through the machine. This is accomplished by pressure roller 93 being mounted to a shaft 94 pivoted at each end in one end of a pair of parallel pressure cam arms 95, each of which is pivoted at an intermediate point about a shaft 96 secured upon the framework 29. The opposite ends of the arms 95 are connected together by a cross arm 97 which supports an adjustable bolt 98 the lower end of which is engageable by a cam 99 manually pivotable about a bolt 100 secured upon the framework 29. A convenient handle 101 allows easy operation of the cam 99.

A stud 102 is mounted on the sector gear 87 and projects outwardly on one side thereof. A lever 103 is mounted at its one end on a pin 104 secured to the framework 29. At the opposite end, the lever 103 is attached to one end of a tension rod 105 which is attached at its opposite end to an arm 106 secured to a shaft 107 of a numerical counter unit 108. The counter 108 is electrically connected to the electrical circuit of the machine and serves to shut off the machine when the number of printed copies indicated by the counter is attained.

A manually controlled knob 109 upon the counter 108 provides means for setting the number of copies to be printed. As shown in FIG. 4, it will be readily apparent that movement of lug 102 about shaft 50 will cause lever 103 to pivot about pin 104 causing arm 106 to impart a numerical registration to the counter 108.

The gear box output shaft 50 also carries a cam 110 shown in FIGS. 3 and 7 which activates arms 111 of micro switches 112, 113 and 114 mounted on bracket 115 secured upon platform 42. The micro switches are located in the electrical circuit to the counter, to a transformer and rheostat to each of the light boxes, and to a cutter solenoid (to be described hereinafter), all as shown in FIG. 13.

Upon the platform 42 there is also a bracket 115 which supports a solenoid 116 shown in FIG. 8. The solenoid has a retractable shaft 117 connected through a link 118 to one end of a lever 119 which is pivotable about a shaft 120. The lever carries rigidly secured thereto a transversely-extending blade element 121 which is pivotable relative to a stationary blade element 122 secured upon the framework 29. As shown in FIG. 8 the positive photographic paper 32a passes between the blade elements 121 and 122 whereby pivotal movement of the lever 119 will cause the movable blade element 121 secured thereto to cut the paper 32a, as the movable blade element passes the edge of the stationary blade 122.

Upon the bracket 40 a take up motor 123 is mounted. A pulley 124 on the motor shaft 125 drives through an endless belt 126, a large pulley 127 mounted on a stub shaft 128. A small pulley 129 also mounted on the stub shaft 128 supported on bracket 40 drives through an endless belt 130, a large pulley 131 mounted on the take up roller 41 mounted on a shaft 132 supported likewise on bracket 40.

The control box contains electrical equipment for timing the lighting of the neon lamps, and includes controls for the motors and selective use of the solenoid cutter.

In operative use, the machine is placed in a photographer's dark room and a roll of positive photographic paper is mounted on the machine spindle and is threaded through the machine and onto the take up roller.

In operative use, the light box is placed into inoperative position with the negative glass facing upward. A photographic negative 133 is mounted thereupon by means of adhesive tapes 134. Filter paper is placed between the filter glasses as required to provide the desired amount of light intensity to reach various areas of the negative.

The light box is then pivoted into operative position over the positive photographic paper.

The counter unit is set for the number of positive copies to be printed. With the light box lamp controls in an "on" position the motors are then started causing the paper to advance intermittently to bring a new area thereof under the light box. After each advancement of the paper, the platen is raised causing the paper to be brought into contact with the negative for a predetermined exposure time during which time the light goes on within the light box for the required time after which it goes off. Then the platen lowers and the paper advances, the process being repeated.

It will be noted that in an operative use, a person may do set up work on one of the light boxes while the other light box is in printing operation. Thus a person tries to have the negative properly mounted and filtered by the time the current printing job is completed. Thus there is no time loss in keeping the machine idle while a setting up is done, such as is common on conventional printing machines presently in use. As soon as the current printing job is completed, the light box used therewith is pivoted out of the way and the newly set up light box is swung over the paper 32a and the machine is ready to run the next job as soon as the counter is set. While the new job is now being printed the person can prepare the former light box for setting up the next following printing job. Thus time is saved and the machine produces a more rapid profit.

The solenoid cutter may or may not be used, as preferred.

As shown in FIGS. 6 and 8, a commercially well known meshing unit 135 may be also included in the present device so to provide a visual pencil mark indication where the positive photographic paper is to be cut when the paper is to be cut when the paper is subsequently placed into a different machine wherein a photoelectric cell picks up a signal as the pencil mark passes by thus causing the photo electric cell to activate a cutting mechanism. The marking unit is mounted upon a side of the platen and moves vertically therewith to cause upstanding pencil point 136 of the unit 135 to draw a pencil mark on the underside of paper 32a at the moment that the platen is raised against paper 32a.

In a modified form of construction shown in FIG. 10 a positive cutter mechanism is shown wherein there is a sector gear 87' driving a gear 88'. A cam 137 is mounted on one side of sector gear 87' and a cam follower 138 mounted on lever 139 engages cam 137. The lever is pivoted at one end on shaft 120' and at its opposite end is spring biased by a tension coil spring 140 secured to the framework 29'. Cutter blade 121' is secured to lever 139 and is in position for cooperation with blade 122'. A rod 141 is connected at its one end to lever 139 and at its other end to arm 106' of counter 108'.

In a further modified form of the invention shown in FIG. 12, the device includes an adjustable positive paper feed unit 142 thereby permitting the feeding of a controlled amount of paper under the light box. The feed unit 142 includes a one way clutch 143 mounted upon size shaft 89''. The clutch 143 is of a type commercially available and well known wherein rotational movement is allowed in one direction only. In the present device the clutch includes a gear 144 which drives a gear rack 145 into a feed direction 146. A lever 147 is slidably and pivotally attached to an elongated lug 145' fixed to and depending from the underside of rack 145 by means of a pin 148 extending laterally of the lug and riding in and interlocked with an elongated closed slot 147', the lever being pivotable about a pin 149 through the opposite end of the lever.

The pin is supported upon the framework 29''. A cam 150 mounted upon shaft 50'' provides drive means to urge the lever and rack toward the feed direction 146. A return spring 151 attached at one end to lever 147 and at the other end to framework 29'' provides return means for the rack into return direction 152.

An adjustable bar 153 adjustably mounted on the framework 29'' provides a stop means for return of the rack thereby limiting the amount of travel thereof; the amount of travel of the rack corresponding to the length of paper being fed at each cycle under the light box. The bar 153 has a butt end 154 which abuts end 155 of the rack 145 which slides within a track 156. The sliding 147' and pin 148 connection between the lug 145' and the lever 147 permits this sliding movement. The bar 153 has a plurality of openings 157 each of which may be selectively aligned with openings 158 in the framework 29'' and a pin or bolt 159 passed therethrough thereby securing the bar in the selected position. This mechanism is in substitution of the drive shown in FIG. 4. Thus a drive is shown which permits the machine to be adaptable for printing various sizes of photographs.

While various changes may be made in the detailed construction, it is understood that such changes will be within the spirit and scope of the present invention as defined by the appended claims.

Having thus set forth my invention, what I claim and desire to secure by Letters Patent of the United States is:

1. In a photographic printing machine, the combination of a framework, means carried by said framework to support a reel of positive photographic paper, means for movement of said positive photographic paper across said framework, means for intermittently halting said movement of said positive photographic paper, means for exposing said positive photographic paper to a negative, a pair of light boxes carried by said framework, either of said light boxes being adaptable to hold said negative during exposure thereof to said positive photographic paper, and each of said light boxes having means for being selectively pivotable on said framework from an inoperative position to a printing position above said positive photographic paper.

2. In a photographic printing machine, the combination of a framework, means carried by said framework to support a reel of positive photographic paper, means for movement of said positive photographic paper across said framework, means for intermittently halting said movement of said positive photographic paper, means for exposing said positive photographic paper to a negative, a pair of light boxes carried by said framework, either of said light boxes being adaptable to hold said negative during exposure thereof to said positive photographic paper, and each of said light boxes having means for selectively movable on said framework from an inoperative position to a printing position above said positive photographic paper, wherein said framework comprises a pair of longitudinal side frames, a plurality of cross bars connecting said frames, one longitudinal end of said framework comprising an undeveloped paper input end and the opposite longitudinal end comprising an exposed paper output end, and a platform between said frames for supporting principal driving mechanisms of said machine.

3. In a photographic printing machine, the combination of a framework, means carried by said framework to support a reel of positive photographic paper, means for movement of said positive photographic paper across said framework, means for intermittently halting said movement of said positive photographic paper, means for exposing said positive photographic paper to a negative, a pair of light boxes carried by said framework, either of said light boxes being adaptable to hold said negative during exposure thereof to said positive photographic paper, and each of said light boxes having means for being selectively movable on said framework from an inoperative position to a printing position above said positive photographic paper, wherein said framework comprises a pair of longitudinal side frames, a plurality of cross bars connecting said frames, one longitudinal end of said framework comprising an undeveloped paper input end and the opposite longitudinal end comprising an exposed paper output end, and a platform between said frames for supporting principal driving mechanisms of said machine, wherein said means to support said reel of undeveloped paper comprises a horizontal notch in each of said frames, a spindle supported between said notches and a vertically-extending lock pin removably retained within an opening in said frames enclosing the spindle within said notches.

4. In a photographic printing machine, the combination of a framework, means carried by said framework to support a reel of positive photographic paper, means for movement of said positive photographic paper across said framework, means for intermittently halting said movement of said positive photographic paper, means for exposing said positive photographic paper to a negative, a pair of light boxes carried by said framework, either of said light boxes being adaptable to hold said negative during exposure thereof to said positive photographic paper, and each of said light boxes having means for being selectively movable on said framework from an inoperative position to a printing position above said positive photographic paper, wherein said framework comprises a pair of longitudinal side frames, a plurality of cross bars connecting said frames, one longitudinal end of said framework comprising an undeveloped paper input end and the opposite longitudinal end comprising an exposed paper output end, and a platform between said frames for supporting principal driving mechanisms of said machine, wherein said means to support said reel of undeveloped paper comprises a horizontal notch in each of said frames, a spindle supported between said notches and a vertically-extending lock pin removably retained within an opening in said frames enclosing the spindle within said notches, wherein said principal driving mechanisms comprise a first motor, a gear box containing continuously driven step down gearing driven by said first motor, gear means for providing said intermittent halting of said positive photographic paper, electrical switch means for timing said exposure of said negative to said positive photographic paper, means for cutting said positive photographic paper and means for counting the number of exposures on said positive photographic paper.

5. In a photographic printing machine, the combination as set forth in claim 4, and wherein said means for intermittent halting comprises a continually rotating sector gear on an output shaft of said gear box, a gear engaged to said sector gear, said gear being mounted on a size shaft, a size roller on said size shaft and a pressure roller in line engagement with said size roller, said positive photograph paper passing between said size roller and said pressure roller.

6. In a photographic printing machine, the combination as set forth in claim 5, wherein each of said light boxes is pivotally mounted on opposite ones of said frames, and said both light boxes are movable into a singular area common to both over said positive photographic paper.

7. In a photographic printing machine, the combination as set forth in claim 6, wherein said boxes comprise a hood and a base, a neon lamp within said hood, a pair of filter glasses between said hood and said base for receiving filter paper therebetween, and a negative glass mounted on said base for retaining said photographic negative adhered thereto.

8. In a photographic printing machine, the combination as set forth in claim 7, wherein said means for exposing said positive photographic paper to said photographic negative further comprises a platen on the underside of said positive photographic paper, means for moving said platen vertically against and away from said underside of said positive photographic paper for pressing said positive photographic paper against said photographic negative on said negative glass and freeing contact of said positive photographic paper from said photographic negative.

9. In a photographic printing machine, the combination as set forth in claim 8, wherein said means for moving said platen comprises a cam on said gear box output shaft, one end of a rocker arm driven by said cam, the opposite end of said rocker arm connected to a vertical post secured at its upper end to the underside of said platen.

10. In a photographic printing machine, the combination as set forth in claim 9, wherein said platen contains a rubber mat on the upper side thereof for engagement against the underside of said positive photographic paper.

11. In a photographic printing machine, the combination as set forth in claim 10, wherein said means for cutting said positive photographic paper comprises a solenoid mounted on said platform, a free end of a pivotable lever attached to a shaft of said solenoid, a movable blade element affixed on said lever, and said movable blade element being cooperative with a stationary blade element.

12. In a photographic printing machine, the combination as set forth in claim 11, wherein a bracket is mounted on the said positive paper output end of said framework, take up motor mounted on said bracket gearing connected to and between said take up motor and a take up roller on which said positive photographic paper may be selectively wound after said exposure.

13. The photographic printing machine as defined in claim 2 wherein the means for movement of the positive photographic paper consists of a one-way clutch on the size shaft, said clutch including a photographic paper consisting of a track, a rack slidable on said track, a size shaft, a one-way clutch on said shaft, including a gear meshing with the rack, an elongated lever having an elongated slot at one end having one end pivotally connected to the frame work, the other end of the lever having an elongated closed slot therein, a lug depending from the rack and a pin mounted on the lug and coating with the edges of the slot in the lever to permit the rack to slide on the track, means for pivoting said lever in one direction and means for retracting the lever in the opposite direction.

References Cited
UNITED STATES PATENTS 3,190,204   6/1965   Limberger _____ 95—73

NORTON ANSHER, *Primary Examiner.*

R. A. WINTERCORN, *Assistant Examiner.*